M. Murphy.
Gang Plow.

No. 89,788. Patented May 4, 1869.

Witnesses
J. L. Boone.
A. H. Hale.

Inventor.
Maurice Murphy.
by Dewey & Co.
his Attys.

UNITED STATES PATENT OFFICE.

MAURICE MURPHY, OF VACAVILLE, CALIFORNIA.

IMPROVEMENT IN GANG-PLOWS.

Specification forming part of Letters Patent No. 89,788, dated May 4, 1869.

*To all whom it may concern:*

Be it known that I, MAURICE MURPHY, of Vacaville, county of Solano, State of California, have invented an Improved Gang-Plow; and I do hereby declare the following description and accompanying drawings are sufficient to enable any person skilled in the art or science to which it most nearly appertains to make and use my said invention or improvement without further invention or experiment.

My invention relates to certain improvements in gang-plows; and consists, first, in so attaching the supporting-frame of the plows to a bent or crank axle that the depth to which it is decided to cut on any piece of land is easily regulated and varied from two to ten inches.

It also consists in a novel construction of the share and mold-board, by which much greater efficiency and ease in cutting and laying the furrows are obtained.

The first part of my invention is made by supporting the frame of the plows upon a crank-axle, a suitable lever being attached, by which to raise and lower it, this device being common.

The land-wheel turns upon an axle which has a half-crank, and this crank has its eye made polygonal, and fitting on a similarly-formed pin, the number of sides being determined, so that the plows shall have three or more different levels on which to work.

The share is constructed long and low, but convexed slightly above. The mold-board commences at the base of the share, being made considerably narrower, and its lower edge is convex or curved under, the curve gradually changing, so as to be concave near the top. The standards are cast in such a manner as to be easily renewed in case of wear.

To more fully describe my invention, reference is made to the accompanying drawings and letters of reference.

Figure 1:
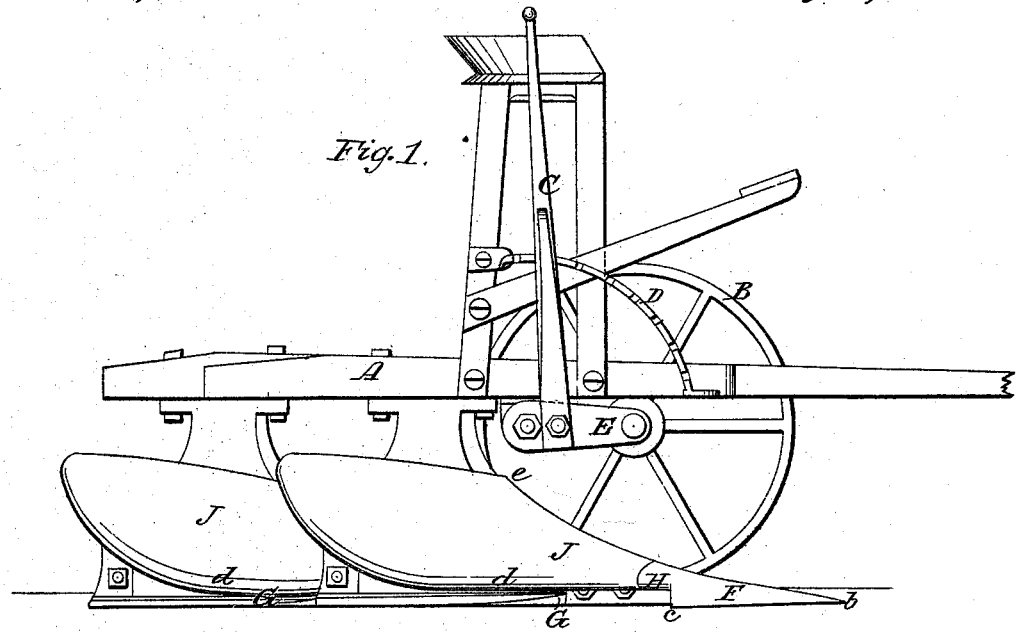
Figure 2:
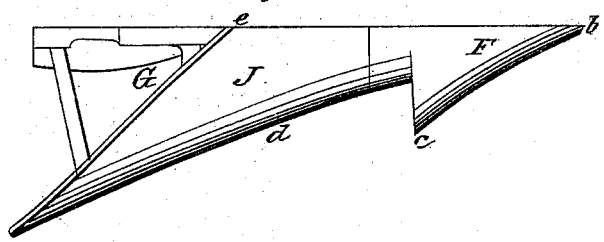
Figure 3:
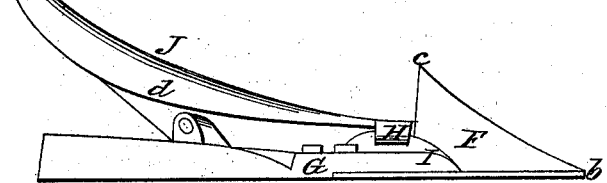
Figure 4:
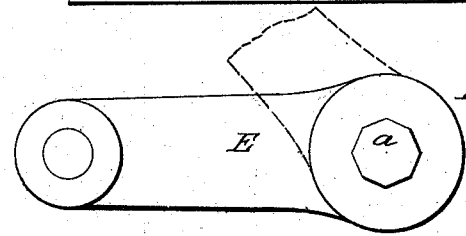

Figure 1 is a side view, showing the plows. Fig. 2 is a plan view of the mold-board and share. Fig. 3 is a bottom view. Fig. 4 is a view of the crank-eye.

Similar letters of reference in each of the figures indicate like parts.

A is the frame of a gang-plow, and is mounted on wheels B by means of a bent or crank axle. The crank on the side of the furrow-wheel is loose, and turns on the axle, the whole frame being raised and lowered by a lever, C, and held at any desired height by a rack, D.

In order to regulate the level at which the furrow-wheel is to travel, and thereby the depth of the furrow, the land-wheel is mounted by means of an adjustable crank, E. The eye of this crank is made polygonal, and the end *a* of the axle on which it fits is similarly shaped. With this device the crank may be removed by taking off a nut, and replaced at an angle to its former position, which will cause the plows to run level when raised or lowered, as desired, and the depth may be varied from two to ten inches.

The plows are of peculiar construction, the share F being long and low, and attached to the land-side G by bolts at one side. The furrow side is bent around, so as to form a sort of socket, H, into which the point I of the land-side enters, holding it fast. The share is slightly convexed on its upper surface, and is widened from the point *b* back to *c*, so that it passes under the soil with comparatively little resistance. Behind the point *c* the share is suddenly contracted in width, and is turned under to form the socket H, before mentioned. The mold-board J commences at the rear end of the share, and the outside bottom edge *d* is made convex instead of concave, and turns under very slightly at the front end, but more toward the rear.

This manner of forming the plow gives it a surface which is concave from the point *b* of the share in a line to the top *e* of the mold-board, but convex in any line transverse to this, which, with the manner of curving the rear of the mold-board, gradually raises the soil presenting the least possible resistance, and lays the furrow smoothly, and is especially useful in wet or heavy ground or adobe soil, such as is frequently found in California, as the form of the mold-board prevents clogging, and always keeps the plow free from the adhesive soil.

Having thus described my invention, what I claim as new, and desire to secure by Letters Patent, is—

1. In combination with the arm or lever C, rigidly fixed upon the crank for raising the plow-frame, the adjustable connection of the crank E to the axle by a polygonal pin and corresponding eye, substantially as and for the purpose set forth.

2. The low convexed share F, having the extended point c and the eye or socket H, constructed substantially as and for the purpose described.

3. The mold-boards J, when constructed with the surface curved, as described, and having the convexed edge d, substantially as herein described.

In witness whereof I have hereunto set my hand and seal.

MAURICE MURPHY. [L. S.]

Witnesses:
 JOHN L. BOONE,
 A. T. DEWEY.